United States Patent
Wilson (10) Patent No.: US 11,429,272 B2
(45) Date of Patent: Aug. 30, 2022

(54) MULTI-FACTOR PROBABILISTIC MODEL FOR EVALUATING USER INPUT

(75) Inventor: Andrew David Wilson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1753 days.

(21) Appl. No.: 12/732,190

(22) Filed: Mar. 26, 2010

(65) Prior Publication Data

US 2011/0238612 A1 Sep. 29, 2011

(51) Int. Cl.
*G06N 20/00* (2019.01)
*G06F 3/0488* (2022.01)
*G06F 3/0481* (2022.01)
*G06N 7/00* (2006.01)

(52) U.S. Cl.
CPC .......... *G06F 3/0488* (2013.01); *G06F 3/0481* (2013.01); *G06N 7/005* (2013.01); *G06N 20/00* (2019.01)

(58) Field of Classification Search
CPC .............................. G06N 99/005; G06N 20/00
USPC .......................................................... 706/52
See application file for complete search history.

(56) References Cited

U.S. PATENT DOCUMENTS

| 4,332,464 | A | * | 6/1982 | Bartulis | ............... | G03G 15/502 |
| | | | | | | 345/173 |
| 5,231,510 | A | * | 7/1993 | Worthington | ................. | 358/400 |
| 6,323,846 | B1 | * | 11/2001 | Westerman | ........... | G06F 3/0235 |
| | | | | | | 345/173 |
| 6,954,197 | B2 | | 10/2005 | Morrison et al. | | |
| 7,453,439 | B1 | * | 11/2008 | Kushler et al. | ................ | 345/168 |
| 2003/0156145 | A1 | * | 8/2003 | Hullender | ........... | G06F 3/04883 |
| | | | | | | 715/863 |
| 2003/0193481 | A1 | * | 10/2003 | Sokolsky | .............. | G06F 3/0488 |
| | | | | | | 345/173 |

(Continued)

FOREIGN PATENT DOCUMENTS

| EP | 1360642 B1 | 8/2004 |
| WO | 2008032270 A2 | 3/2008 |

OTHER PUBLICATIONS

Rubine, Dean Harris. "The Automatic Recognition of Gestures" Dec. 1991. [Online] Downloaded May 1, 2018 http://citeseerx.ist.psu.edu/viewdoc/download?doi=10.1.1.116.1350&rep=rep1&type=pdf.*

(Continued)

*Primary Examiner* — Ben M Rifkin
(74) *Attorney, Agent, or Firm* — NovoTechIP International PLLC (57) ABSTRACT

A multi-factor probabilistic model evaluates user input to determine if the user input was intended for an on-screen user interface control. When user input is received, a probability is computed that the user input was intended for each on-screen user interface control. The user input is then associated with the user interface control that has the highest computed probability. The probability that user input was intended for each user interface control may be computed utilizing a multitude of factors including the probability that the user input is near each user interface control, the probability that the motion of the user input is consistent with the user interface control, the probability that the shape of the user input is consistent with the user interface control, and that the size of the user input is consistent with the user interface control.

20 Claims, 6 Drawing Sheets

(56) References Cited

U.S. PATENT DOCUMENTS

| | | | |
|---|---|---|---|
| 2003/0193572 A1* | 10/2003 | Wilson | G08C 17/00 348/207.99 |
| 2005/0146508 A1* | 7/2005 | Kirkland et al. | 345/169 |
| 2006/0036944 A1 | 2/2006 | Wilson | |
| 2009/0006958 A1* | 1/2009 | Pohjola | G06F 3/0488 715/710 |
| 2009/0100384 A1* | 4/2009 | Louch | G06F 1/1626 715/863 |
| 2009/0135162 A1 | 5/2009 | Van et al. | |
| 2010/0053116 A1* | 3/2010 | Daverman | G06F 3/0414 345/175 |

OTHER PUBLICATIONS

Cao, et al., "ShapeTouch: Leveraging Contact Shape on Interactive Surfaces", Retrieved at << http://www.cs.toronto.edu/~caox/tabletop2008_shapetouch.pdf >>, 3rd IEEE International Workshop on In 2008 IEEE International Workshop on Horizontal Interactive Human Computer Systems (Tabletop), Oct. 2008, pp. 139-146.

Mithal, Anant Kartik, "Using Psychomotor Models of Movement in the Analysis and Design of Computer Pointing Devices", Retrieved at << http://www.sigchi.org/chi95/proceedings/doctoral/akm_bdy.htm >>, Conference companion on Human factors in computing systems, May 7-11, 1995, pp. 4.

Tamura, et al., "Prediction of Target Object Based on Human Hand Movement for Handing-Over between Human and Self-Moving Trays", Retrieved at << http://ieeexplore.ieee.org/stamp/stamp.jsp?arnumber=04107807 >>, The 15th IEEE International Symposium on Robot and Human Interactive Communication (RO-MAN06), Sep. 6-8, 2006, pp. 189-194.

Grossman, et al., "The Bubble Cursor: Enhancing Target Acquisition by Dynamic Resizing of the Cursor's Activation Area", Proceedings of the SIGCHI conference on Human factors in computing systems, Conference on Human Factors in Computing Systems, 2005, pp. 281-290.

* cited by examiner

MULTI-FACTOR PROBABILISTIC MODEL FOR EVALUATING USER INPUT

BACKGROUND

Graphical user interfaces ("GUIs") typically allow a user to interact with a computer system by providing a variety of on-screen user interface controls ("controls"). For instance, a GUI might present menu controls, scroll bar controls, button controls, and other types of controls to a user. The user can then utilize a user input device to select and otherwise interact with the controls. For instance, a user might utilize a touch screen user input device, a mouse user input device, or another type of user input device to interact with the controls.

In order to determine whether a user has provided input intended for a particular control, current computing systems typically compare the two-dimensional coordinates of the user input to the bounding coordinates of all on-screen controls. If the coordinates of the received user input lie within the bounding coordinates of an on-screen control, then the user input is considered to have been intended for that control. This mechanism is commonly referred to as "point-in rectangle hit testing."

Point-in-rectangle hit testing is suitable for use with user input devices that have a high degree of precision, such as a mouse user input device. Point-in-rectangle hit testing can be problematic, however, when utilized with touch screen user input devices and other types of user input devices that do not have the precision of a mouse user input device. Moreover, the high degree of precision typically required by point-in-rectangle hit testing mechanisms may also cause frustration for users that do not possess the fine motor skills necessary to precisely select on-screen user interface controls.

It is with respect to these considerations and others that the disclosure made herein is presented.

SUMMARY

A multi-factor probabilistic model for evaluating user input is presented herein. Through the utilization of the multi-factor probabilistic model, several of the limitations of point-in-rectangle hit testing can be minimized or eliminated. For instance, using the multi-factor probabilistic model presented herein, user input can be evaluated in a manner that reduces the precision typically required by point-in-rectangle hit testing. This can be beneficial when used in conjunction with touch screen user input devices and other types of user input devices that do not have the precision of a mouse user input device. This may also be beneficial when used by users that do not possess the fine motor skills necessary to precisely select on-screen user interface controls. Moreover, because the multi-factor probabilistic model presented herein takes multiple factors into account, a user may approach interactions with a computer that utilizes the model in a variety of ways. For instance, the user might interact with user interface elements by precise positioning as done previously, by unique gesture, by hand pose or shape, or in another manner.

According to one aspect presented herein, a multi-factor probabilistic model is utilized to evaluate user input to determine if the user input is intended for an on-screen user interface control. In particular, when user input is received, the probability that the user input was intended for each on-screen user interface control is computed. The user input is then associated with the user interface control that has the highest computed probability. In one implementation, the highest probability must also exceed a threshold probability in order for the user input to be associated with the user interface control. The probability that the user input was intended for each user interface control may also be computed over time.

According to another aspect, the probability is computed utilizing the multi-factor probabilistic model. The multi-factor probabilistic model computes the probability that user input was intended for each user interface control utilizing a multitude of factors. For instance, the factors utilized by the model might include, but are not limited to, the probability that the user input is near each user interface control, the probability that the motion, or path, of the user input is consistent with motion typically utilized to control the user interface control, the probability that the shape of the user input is consistent with the shape of user input for controlling the user interface control, and that the size of the user input is consistent with the size of user input for controlling the user interface control. Each factor may be assigned a weight.

According to another aspect, a high probability might be calculated for several user interface controls. In this case, a suitable user interface may be provided through which a user can specify which of the user interface controls that the user input was intended for. For instance, the user interface controls having the highest probabilities might be visually emphasized in order to indicate to a user that an ambiguous user input was received. The user might then more particularly select one of the emphasized user interface controls in order to complete the user input operation.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to a multi-factor probabilistic model for evaluating user input. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a multi-factor probabilistic model for evaluating user input will be described.

Figure 1:
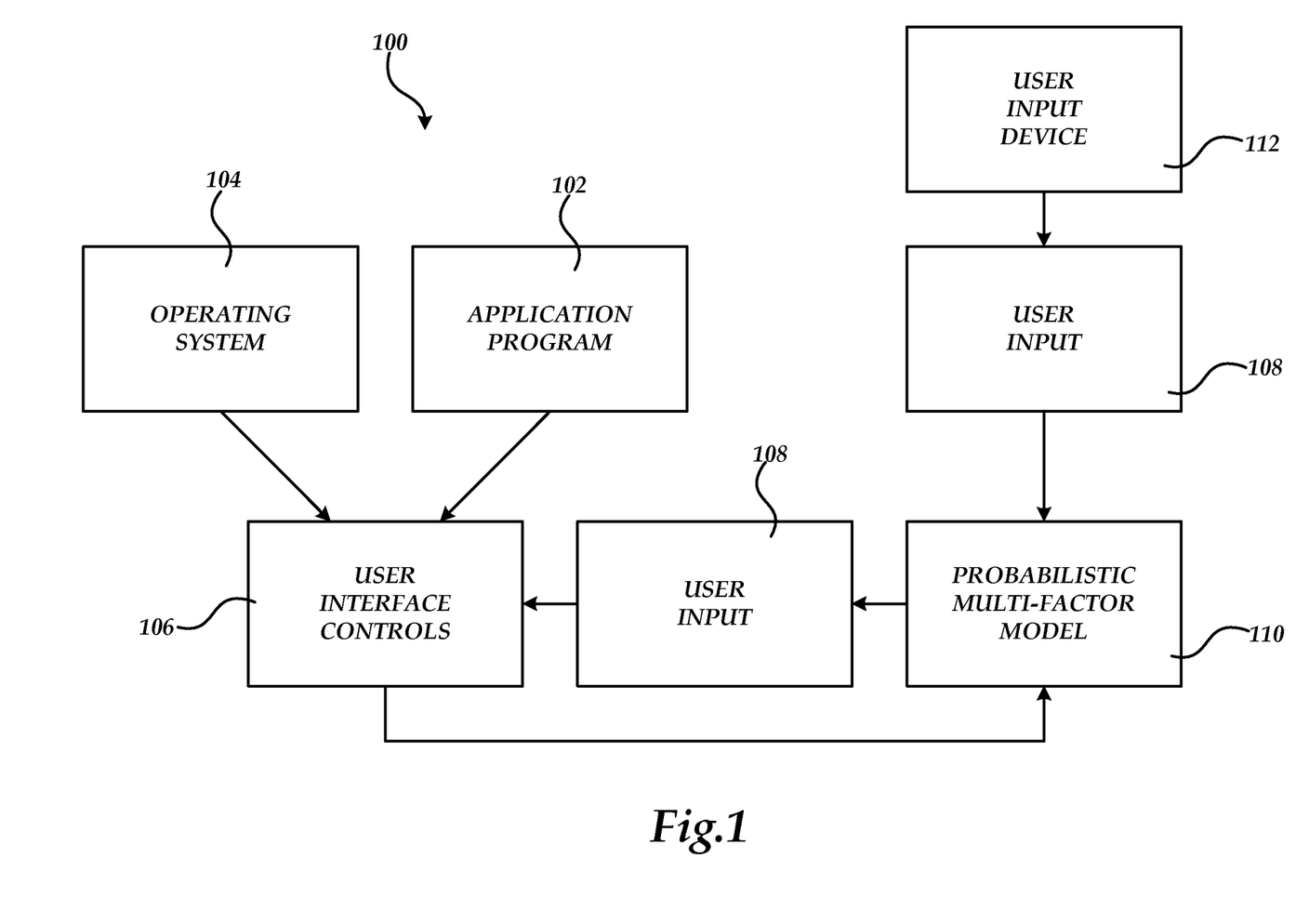
FIG. 1 is a block diagram showing aspects of an illustrative operating environment and aspects of a probabilistic multi-factor model for evaluating user input disclosed herein.

Turning now to FIG. 1, details will be provided regarding one embodiment presented herein for evaluating user input using a probabilistic multi-factor model. In particular, FIG. 1 illustrates aspects of an illustrative operating environment 100 along with aspects of a probabilistic multi-factor model 110 for evaluating user input 108.

As shown in FIG. 1, the operating environment 100 for the embodiments presented herein includes an application program 102 and an operating system 104 capable of generating graphical user interface ("UI") controls 106. As known in the art, UI controls 106 are elements of a graphical user interface that display information to a user and/or that receive input from the user. For instance, the UI controls 106 might include, but are not limited to, scroll bars, check boxes, radio buttons, buttons, selectable icons, menu items, dialog boxes, sliders, list boxes, drop-down lists, toolbars, ribbon controls, combo boxes, tabs, and windows. It should be appreciated that the term UI control as utilized herein encompasses any type of UI element displayed by a program that receives user input 108. It should also be appreciated that although FIG. 1 illustrates only an operating system 104 and an application program 102 generating the UI controls 106, other types of programs might also generate the UI controls 106.

As also illustrated in FIG. 1, a user input device 112 receives user input 108 and provides the user input 108 to a computer system executing the operating system 104 and the application program 102. According to one embodiment presented herein, the user input device 112 is a touch screen user input device, such as a capacitive touch screen. It should be appreciated, however, that the user input device 112 may comprise any type of user input device including, but not limited to, a keyboard, mouse, trackball, joystick, light pen, and game controller. The user input device 112 might also comprise a free space motion capture system. For instance, some free space motion capture systems utilize an infrared emitter and sensor to detect motion in free space. The detected motion can then be provided to a computer system as the user input 108. It should be appreciated that, as used herein, the term user input device 112 refers to any type of device through which a user might provide input to a computer system.

It should also be appreciated that the user input 108 will vary depending upon the type of user input device 112 being utilized. For instance, when the user input device 112 is a touch screen, the user input 108 will comprise a user's interaction with the touch screen. The user input device 112 can generate data that indicates the two-dimensional coordinates of the user's interaction with the touch screen. The data might vary over time, so that user input 108 that has a time component can also be described. For instance, the data might indicate that a gesture was made on the touch screen, such as a swipe across the touch screen with a single or multiple fingers. Other types of user input devices 112 will similarly generate appropriate data that describes the user input 108.

As described briefly above, the user input device 112 receives the user input 108. According to one embodiment presented herein, the user input 108 is then provided to the probabilistic multi-factor model 110. The probabilistic multi-factor model 110 is a software component configured to evaluate the user input 108 to determine which of one or more UI controls 106 that the user input 108 should be provided to. Although illustrated in FIG. 1 as being separate from the operating system 104 and the application program 102, the probabilistic multi-factor model 110 might be integrated with the operating system 104 or the application program 102. The probabilistic multi-factor model 110 might also execute as part of another type of program.

As will be described in greater detail below, when user input 108 is received, the probabilistic multi-factor model 110 computes the probability that the user input 108 was intended for each on-screen UI control 106. The probabilistic multi-factor model 110 then associates the received user input 108 with the UI control 106 that has the highest computed probability. In one implementation, the highest probability must also exceed a threshold probability in order for the user input 108 to be associated with a UI control 106. The probability that the user input 108 was intended for each UI control 106 might also be computed over time. In this way, user input 108 that varies with time, such as gestures, can be evaluated over the duration of the user input 108 to determine the intended UI control 106. As discuss briefly above, because the multi-factor probabilistic model 110 takes multiple factors into account, as more fully described herein, a user may approach interactions with a computer that utilizes the model in a variety of ways. The user might interact with the user interface controls 106 by precise positioning as done previously, by unique gesture, or by hand pose or shape, for instance.

According to another aspect, the multi-factor probabilistic model 110 computes the probability that the user input 108 was intended for each UI control 106 utilizing a multitude of factors. For instance, the model 110 might utilize factors including, but not limited to, the probability that the user input 108 is near each UI control 106, the probability that the motion, or path, of the user input 108 is consistent with motion typically utilized to control the UI control 106, the probability that the shape of the user input 108 is consistent with the shape of user input for controlling the UI control 106, and that the size of the user input 108 is consistent with the size of user input for controlling the UI control 106. Each factor might also be weighted. Facilities might also be provided for allowing a user to specify or modify the weight assigned to each factor.

According to another aspect, the probabilistic multi-factor model 110 provides a user interface for allowing a user to disambiguate the user input 108. For instance, in some scenarios the probabilistic multi-factor model 110 might compute a high probability for several user interface controls 106. In this case, the probabilistic multi-factor model 110 might provide a suitable UI through which a user can specify the UI control 106 that the user input 108 was intended for. For instance, the UI controls 106 having the highest probabilities might be visually emphasized in order to indicate to a user that ambiguous user input 108 was received. The user might then more particularly select one of the emphasized UI controls 106 in order to specify that the selected UI control 106 is the intended control. Additional details regarding the operation of the probabilistic multi-factor model 110 in this regard will be provided below with respect to FIGS. 2-5.

Figure 2:
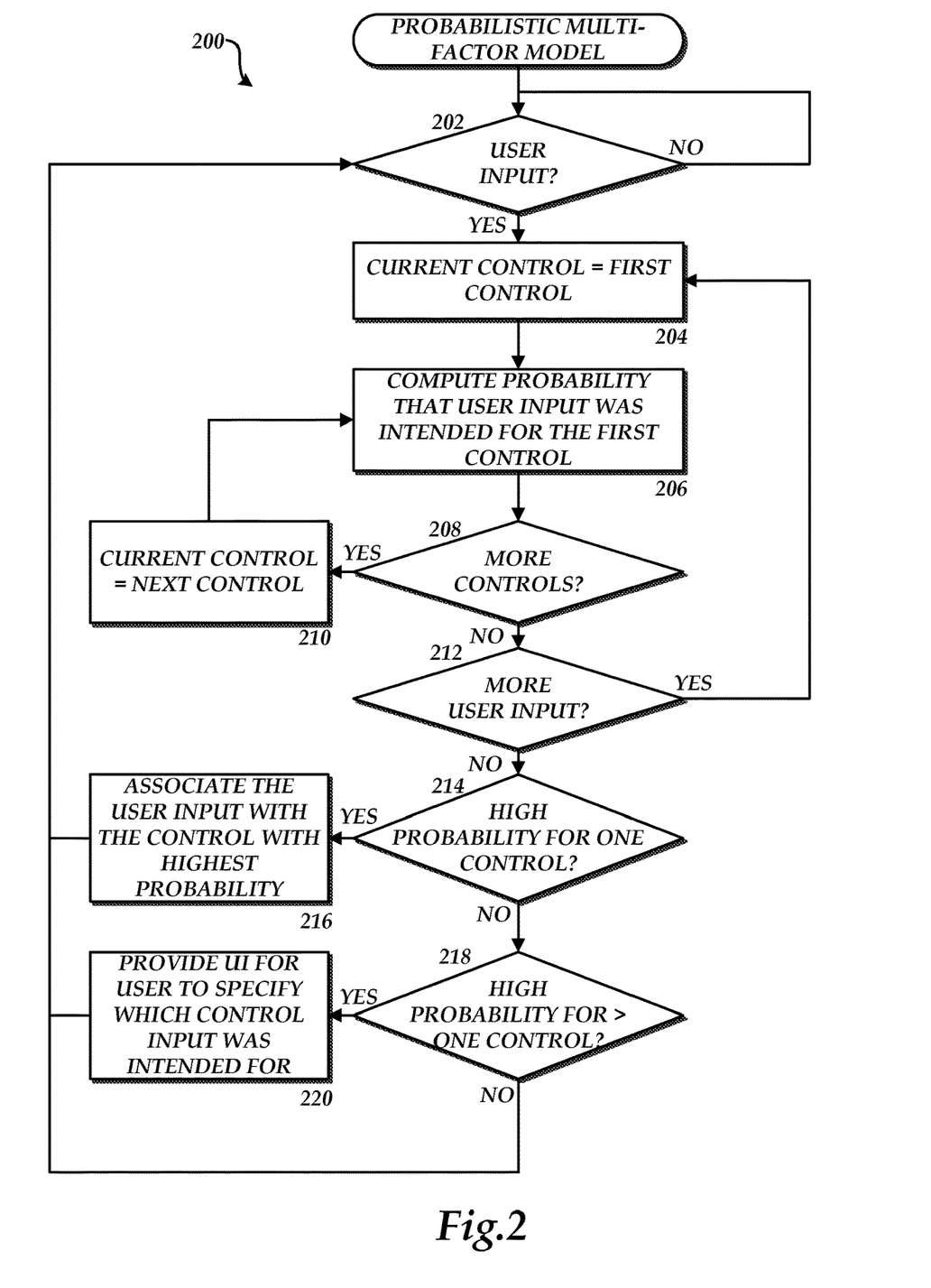
FIG. 2 is a flow diagram showing aspects of the operation of a probabilistic multi-factor model for evaluating user input in one embodiment presented herein.

Turning now to FIG. 2, additional details will be provided regarding the embodiments presented herein for evaluating user input 108 using a probabilistic multi-factor model 110. In particular, FIG. 2 is a flow diagram that includes a routine 200 showing aspects of an illustrative process performed by the probabilistic multi-factor model 110 when evaluating user input 108.

It should be appreciated that the logical operations described herein with respect to FIG. 2 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 begins at operation 202, where the probabilistic multi-factor model 110 determines whether user input 108 has been received. If user input 108 has been received, the routine 200 proceeds to operation 204, where a variable (referred to herein as the "current UI control variable") is initialized to identify one of the on-screen UI controls 106. The current UI control variable identifies the UI control 106 for which the probabilistic multi-factor model 110 is currently computing a probability (the "current UI control"). Once the current UI control variable has been initialized, the routine 200 proceeds from operation 204 to operation 206.

At operation 206, the probabilistic multi-factor model 110 computes the probability that the user input 108 was intended for the current UI control 106. As described briefly above, the multi-factor probabilistic model 110 computes the probability that the user input 108 was intended for the current UI control 106 utilizing a multitude of factors. According to one embodiment, the probability that the user input 108 was intended for manipulating the current UI control 106 is computed as $P_{input}(C)=(W_1*P_{input}(\text{near } C))* (W_2*P_{input}(\text{motion consistent with } C))* (W_3*P_{input}(\text{shape/size consistent with } C)* \ldots$, where C represents the UI control 106 being evaluated, $P_{input}(\text{near } C)$ is the probability that the user input 108 is near the current UI control 106, $P_{input}(\text{motion consistent with } C)$ is the probability that the motion, or path, of the user input 108 is consistent with motion typically utilized to control the current UI control 106, and $P_{input}(\text{shape/size consistent with } C)*$ represents the probability that the shape and/or size of the user input 108 is consistent with the shape and/or size of user input for controlling the current UI control 106. $W_1$-$W_3$ represent weights assigned to each of the factors. As discussed briefly above, facilities might also be provided for allowing a user to specify or modify the weight assigned to each factor.

It should be appreciated that the factors identified above are merely illustrative and that the probabilistic multi-factor model 110 may compute the probability that the user input 108 was intended for the current UI control 106 using other factors. For instance, the factors may take into consideration the motion, gesture, shape, context, and history of the user input 108. The probabilistic multi-factor model 110 might also utilize other factors when determining the probability.

Once the probability that the user input 108 was intended for the current UI control 106 has been computed at operation 206, the routine 200 proceeds to operation 208. At operation 208, the probabilistic multi-factor model 110 determines whether there are other on-screen UI controls 106 for which the probability should be calculated. If so, the routine 200 proceeds from operation 208 to operation 210 where the current UI control variable is incremented to identify the next UI control 106. The routine 200 then proceeds from operation 210 to operation 206 where the probability that the user input 108 was intended for manipulating the current UI control 106 is computed in the manner described above.

If, at operation 208, the probabilistic multi-factor model 110 determines that there are no additional UI controls 106 for which the probability should be calculated, the routine 200 proceeds to operation 212. At operation 212, the probabilistic multi-factor model 110 determines whether additional user input 108 has been received. For instance, additional user input 108 may be received where the user input 108 is a gesture that varies over time. In this way, the probabilistic multi-factor model 110 will continually compute the probability that the user input 108 was intended for each of the UI controls 106 over the time that the user input 108 is made. If more user input 108 has been received, the routine 200 returns to operation 204 described above, where the probability that the user input 108 was intended for each of the UI controls 106 is again computed. If no additional user input 108 has been received, the routine 200 proceeds from operation 212 to operation 214.

At operation 214, the probabilistic multi-factor model 110 determines whether the probability calculations described above resulted in a high probability that a single UI control 106 was the intended recipient of the user input 108. In one implementation, the highest probability must also exceed a threshold probability in order for the user input 108 to be associated with a UI control 106. If one UI control 106 had a high probability, the routine 200 proceeds from operation 214 to operation 216.

At operation 216, the probabilistic multi-factor model 110 associates the user input 108 with the UI control 106 having the highest computed probability. Associating the user input 108 with the UI control 106 might include passing the user input 108 directly to the UI control 106, notifying the operating system 104 or application 102 that user input 108 was received for the UI control 106, or causing the UI control 106 to be notified of the receipt of the user input 108 in another manner. From operation 216, the routine 200 proceeds to operation 202, described above.

If, operation 214, the probabilistic multi-factor model 110 does not conclude that the probability calculations described above resulted in a high probability for a single UI control 106, the routine 200 proceeds from operation 214 to operation 218. At operation 218, the probabilistic multi-factor model 110 determines whether the probability calculations described above resulted in a high probability that multiple UI controls 106 were the intended recipient of the user input 108. If not, the routine 200 proceeds to operation 202 described above. If so, the routine 200 proceeds to operation 220, where the probabilistic multi-factor model 110 causes a user interface to be provided that allows the user to disambiguate the user input 108. In one embodiment, for example, the probabilistic multi-factor model 110 provides a suitable UI through which the user can specify the UI control 106 that the user input 108 was intended for. For instance, the UI controls 106 having the highest probabilities might be visually emphasized in order to indicate to a user that ambiguous user input 108 was received. The user might then more particularly select one of the emphasized UI controls 106 in order to specify that the selected UI control 106 is the intended UI control 106. From operation 220, the routine 200 returns to operation 202, described above.

Figure 3:
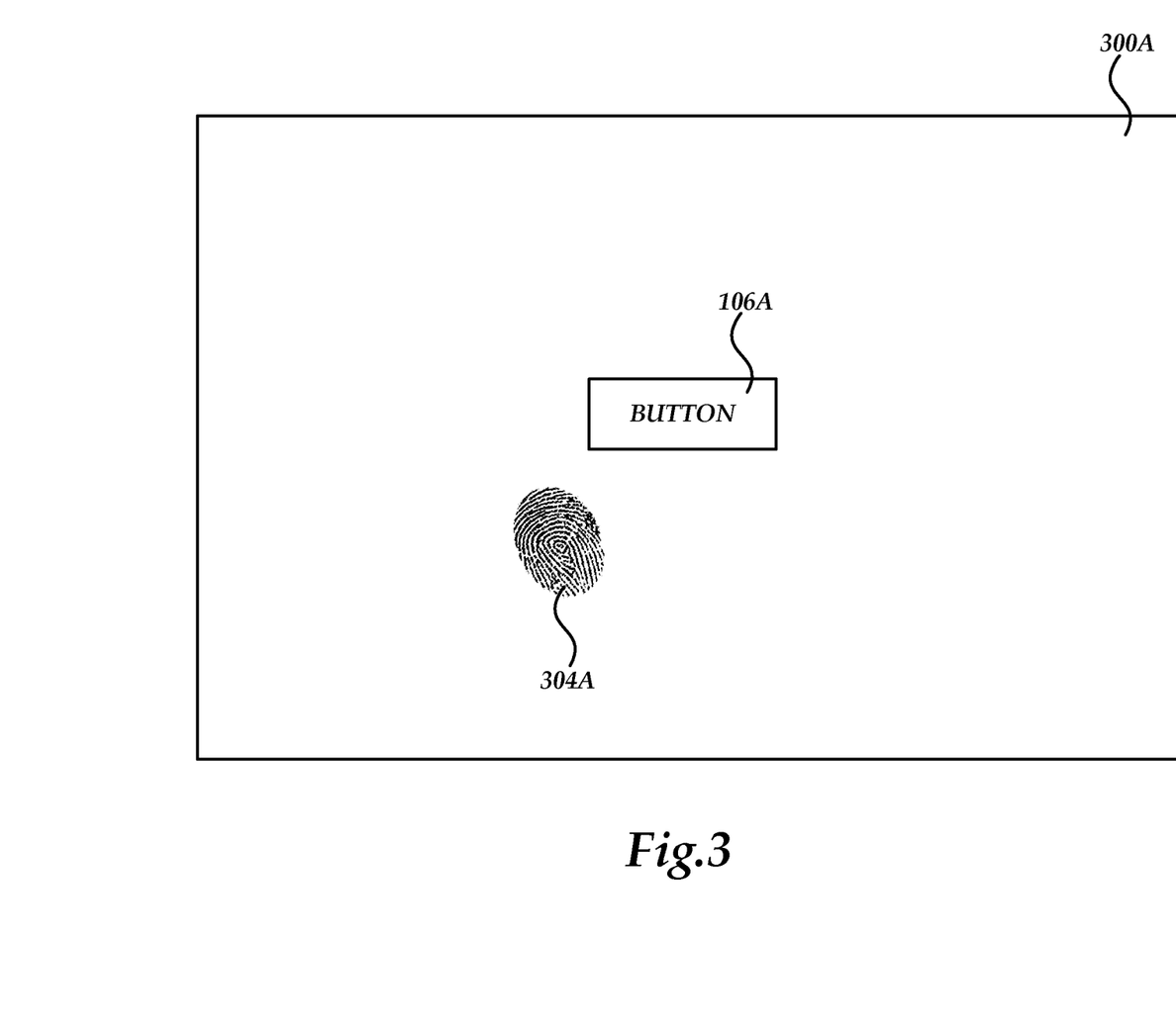
FIGS. 3-5 are screen diagrams illustrating the application of the probabilistic multi-factor model provided herein to several sample user inputs.
Figure 4:
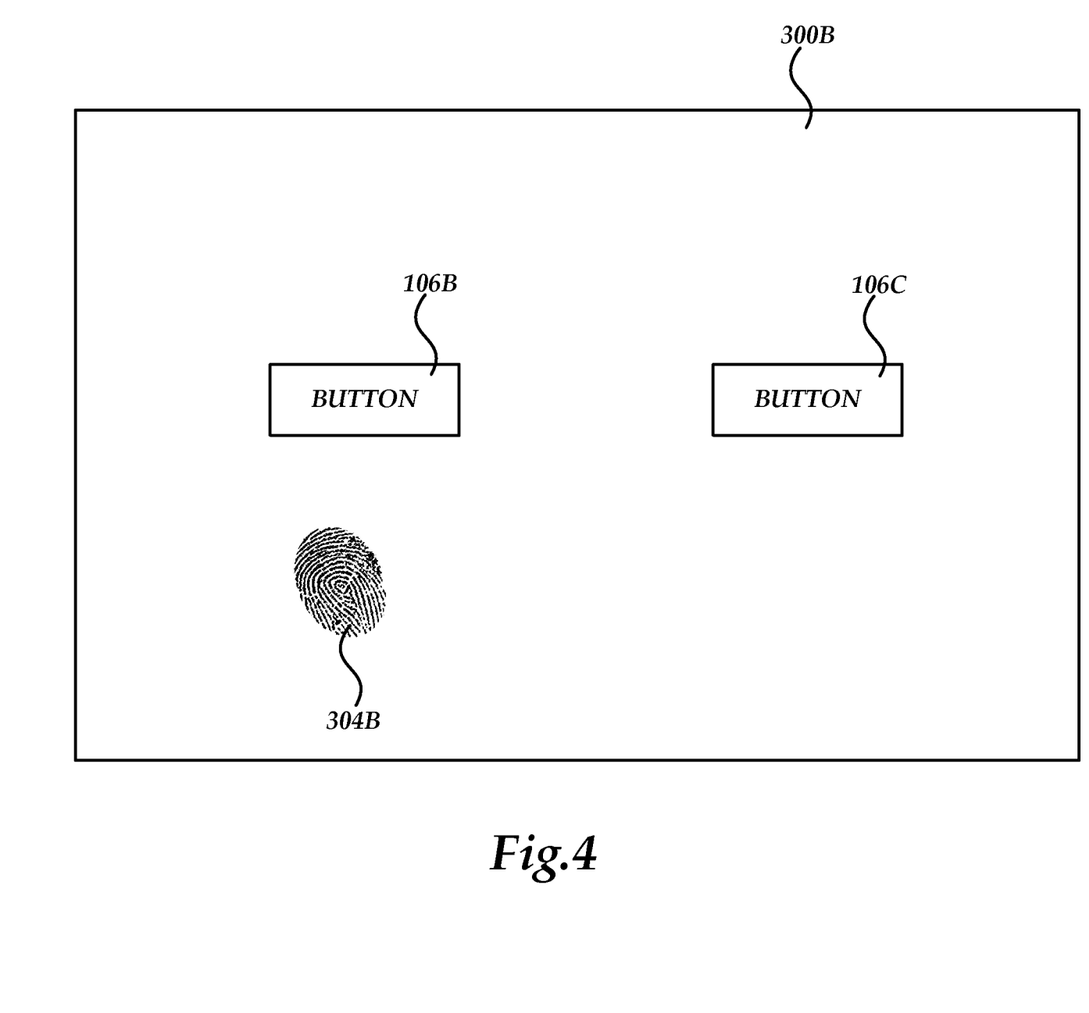
Figure 5:
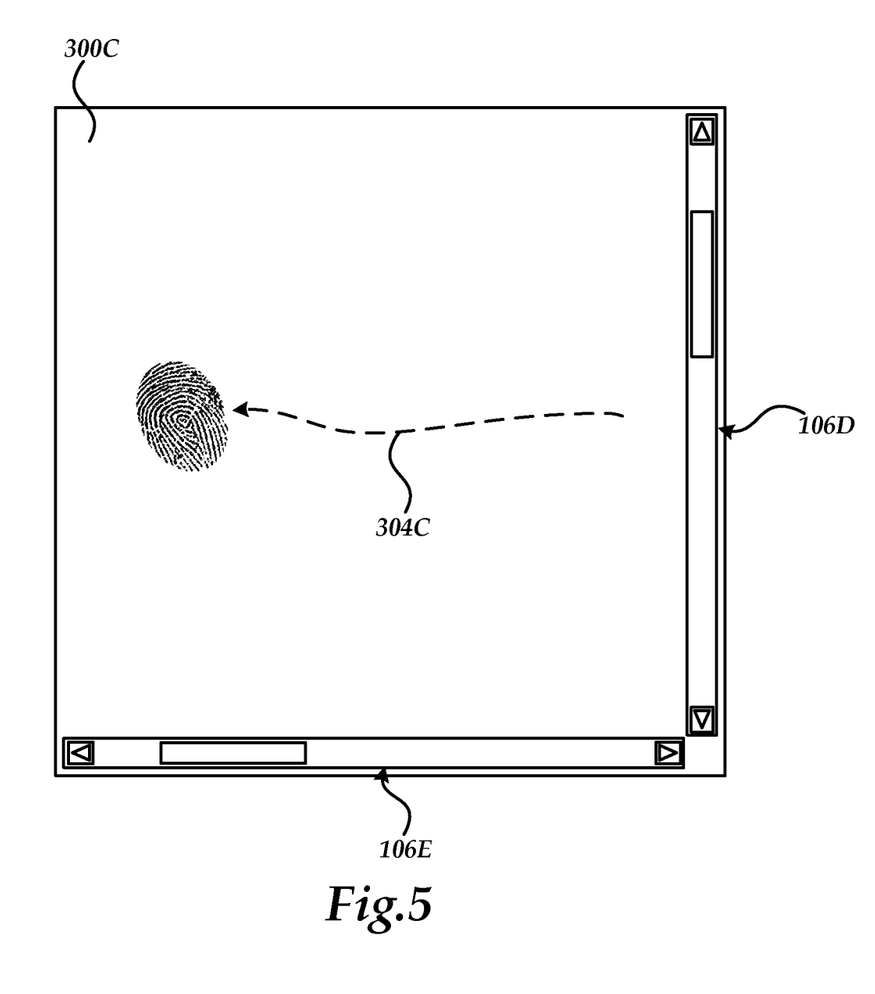

Referring now to FIGS. 3-5, several screen diagrams illustrating the application of the probabilistic multi-factor model 110 provided herein to several sample user inputs will be described. In particular, FIG. 3 shows a screen display 300A provided by a user input device 112 equipped with a touch screen. The screen display 300A in this example includes a single UI control 106A, which is a button. In this example, user input 108 has been received on the touch screen in the form of a single touch 304A. Using previous point-in-rectangle hit testing mechanisms, the single touch 304A would not register as a selection of the UI control 106A because the touch 304A is not within the boundaries of the UI control 106A Using the probabilistic multi-factor model 110 provided herein, however, the single touch 304A may be registered as a selection of the UI control 106A even though the touch 304A is not within the boundaries of the UI control 106A. This is because the probabilistic multi-factor model 110 may take into account the type of user input (e.g. a single touch 304A), the distance from the touch 304A to the UI control 106A (e.g. relatively close), the consistency of the touch 304A with the type of input expected by the UI control 106A (e.g. very consistent), the consistency of the shape and size of the touch 304A with the shape and size of input expected by the UI control 106A (e.g. very consistent), other on-screen UI controls (e.g. none), and other factors. In light of these factors, the probabilistic multi-factor model 110 may compute a high probability that the touch 304A was intended for the UI control 106A and associate the touch 304A with the UI control 106A. In this way, the touch 304A might select the UI control 106A even though the touch 304A is not within the boundaries of the actual control.

FIG. 4 shows a screen display 300B provided by a user input device 112 equipped with a touch screen. The screen display 300B in this example includes a two UI controls 106A and 106B, both of which are buttons. In this example, user input 108 has been received on the touch screen in the form of a single touch 304B. Using previous point-in-rectangle hit testing mechanisms, the single touch 304B would not register as a selection of either of the UI controls 106A and 106B, because the touch 304A is not within the boundaries of either of these controls.

Using the probabilistic multi-factor model 110 provided herein, however, the single touch 304B may be registered as a selection of the UI control 106B even though the touch 304B is not within the boundaries of the UI control 106B. This is because the probabilistic multi-factor model 110 may take into account the type of user input (e.g. a single touch 304B), the distance from the touch 304A to the UI controls 106B and 106C (e.g. close to the UI control 106B but further from the UI control 106B), the consistency of the touch 304A with the type of input expected by the UI controls 106A and 106B (e.g. very consistent), the consistency of the shape and size of the touch 304B with the shape and size of input expected by the UI controls 106A and 106B (e.g. very consistent), and other factors. In light of these factors, the probabilistic multi-factor model 110 may compute a high probability that the touch 304B was intended for the UI control 106B and associate the touch 304B with the UI control 106B since the touch 304B is closer to the UI control 106B than the UI control 106C. In this way, the touch 304B might select the UI control 106B even though the touch 304B is not within the boundaries of this control.

FIG. 5 shows a screen display 300C provided by a user input device 112 equipped with a touch screen. The screen display 300C in this example includes a two UI controls 106D and 106E. The UI control 106D is a vertically oriented scroll bar and the UI control 106E is a horizontally oriented scroll bar. In this example, user input 108 has been received on the touch screen in the form of a horizontal swiping gesture 304C across the touch screen. Using previous point-in-rectangle hit testing mechanisms, the gesture 304C would not register as a selection of either of the UI controls 106D and 106E, because the gesture 304C is not within the boundaries of either of these controls.

Using the probabilistic multi-factor model 110 provided herein, however, the gesture 304C may be registered as a selection of the UI control 106E even though the gesture 304C is not within the boundaries of the UI control 106E. This is because the probabilistic multi-factor model 110 may take into account the type of user input (e.g. a horizontal swipe), the distance from the gesture 304C to the UI controls 106D and 106E (e.g. about the same distance to each), the consistency of the gesture 304C with the type of input expected by the UI controls 106D and 106E (e.g. consistent with the UI control 106E but not consistent with the UI control 106D), the consistency of the shape and size of the gesture 304C with the shape and size of input expected by the UI controls 106D and 106E (e.g. consistent with the UI control 106E but not consistent with the UI control 106D), and other factors. In light of these factors, the probabilistic multi-factor model 110 may compute a high probability that the gesture 304C was intended for the UI control 106E and associate the gesture 106E with the UI control 106E since the gesture 304C is a horizontal motion similar to what would be expected by the horizontally oriented UI control 106E. In this way, the gesture 304C might control the UI control 106E even though the gesture 304C is not within the boundaries of this control.

Figure 6:
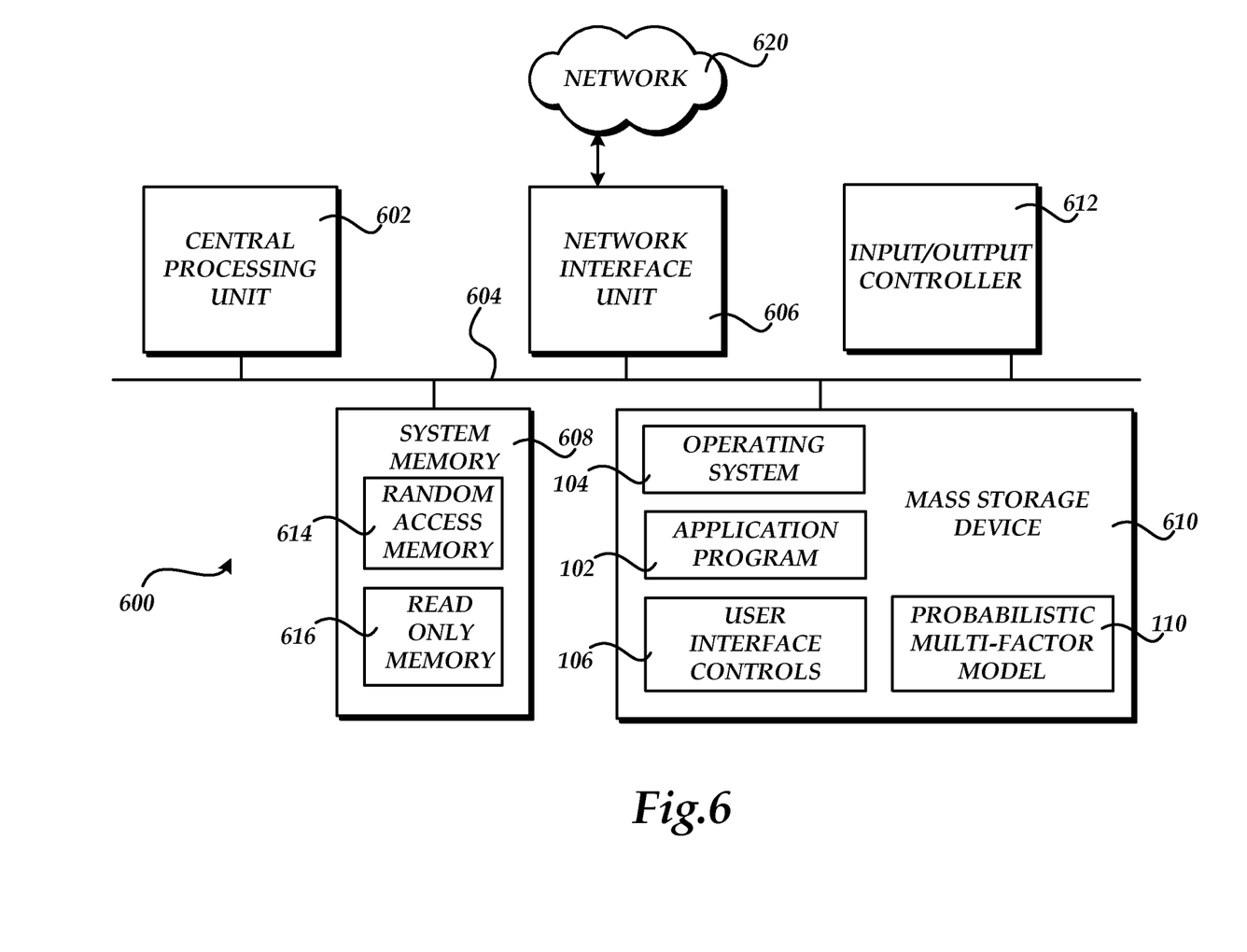
FIG. 6 is a computer architecture diagram showing an illustrative computer hardware and software architecture for a computing system capable of implementing the embodiments presented herein.

FIG. 6 shows an illustrative computer architecture for a computer 600 capable of executing the software components described herein for providing a multi-factor probabilistic model for evaluating user input. The computer architecture shown in FIG. 6 illustrates a conventional desktop, laptop computer, or server computer and may be utilized to execute the software components described herein for providing a multi-factor probabilistic model for evaluating user input.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 618, application programs, and other program modules, which will be described in greater detail below.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store an application program 102 or operating system 104 that provide the functionality described herein for evaluating user input using a multi-factor probabilistic model 110.

In general, software applications or modules may, when loaded into the CPU 602 and executed, transform the CPU 602 and the overall computer 600 from a general-purpose computing system into a special-purpose computing system customized to perform the functionality presented herein. The CPU 602 may be constructed from any number of transistors or other discrete circuit elements, which may individually or collectively assume any number of states. More specifically, the CPU 602 may operate as one or more finite-state machines, in response to executable instructions contained within the software or modules. These computer-executable instructions may transform the CPU 602 by specifying how the CPU 602 transitions between states, thereby physically transforming the transistors or other discrete hardware elements constituting the CPU 602.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that a multi-factor probabilistic model for evaluating user input has been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for evaluating a touch input to control a user interface control, the method comprising:

displaying, by a computing device, one or more user interface controls each defined by respective boundaries;

receiving, at the computing device, the touch input, wherein the received touch input is not received within the respective boundaries of any of the one or more user interface controls;

for each of the one or more user interface controls, computing, by the computing device, a probability that the received touch input was intended to be received by that user interface control based on a comparison of one or more characteristics associated with the received touch input to one or more corresponding characteristics associated with an expected touch input to the user interface control, the one or more characteristics comprising at least one of a shape or a size of the received touch input and of the expected user input; and providing, at the computing device, a notification that the received touch input is a selection of the user interface control having a highest computed probability.

2. The computer-implemented method of claim 1, wherein the probability is further computed based on a proximity of the received touch input to the user interface control.

3. The computer-implemented method of claim 2, wherein the proximity is multiplied by an associated weight prior to associating the received touch input to the user interface control having the highest computed probability.

4. The computer-implemented method of claim 1, wherein providing, at the computing device, the notification that the received touch input is the selection of the user interface control having the highest probability comprises providing, at the computing device, the notification that the received touch input is the selection of the user interface control having the highest probability when the highest probability is greater than a threshold probability.

5. The computer-implemented method of claim 1, wherein the received touch input comprises a motion gesture and the probability that the motion gesture was intended for the user interface control is computed over time.

6. The computer-implemented method of claim 1, further comprising:
determining, by the computing device, whether a plurality of user interface controls each have a high computed probability; and
in response to determining that at least two of the plurality of user interface controls have a high computed probability, providing, by the computing device, a second user interface through which a user can specify which of the at least two of the plurality of user interface controls the received touch input was intended.

7. The computer-implemented method of claim 1, wherein the comparison of the one or more characteristics further comprises a comparison of a motion of the received touch input to a motion of the expected touch input.

8. A system comprising:
at least one processing unit; and
a memory in communication with the at least one processing unit having computer-executable instructions stored thereupon which, when executed by the at least one processing unit, cause the at least one processing unit to perform operations comprising:
displaying a plurality of user interface controls each defined by a boundary;
receiving a user input that is not within the respective boundaries of the plurality of user interface controls;
for at least one of the plurality of user interface controls, computing a probability that the received user input was intended for that user interface control based on a comparison of one or more characteristics associated with the received user input to one or more corresponding characteristics associated with an expected user input to the user interface control, the one or more characteristics comprising a shape or a size of the received user input and of the expected user input; and
generating a notification that the received user input is a selection of the at least one of the plurality of user interface controls having a highest computed probability.

9. The computer-implemented method of claim 1, wherein the one or more user interface controls comprise one or more graphical user interface controls.

10. The system of claim 8, wherein the memory stores further instructions for:
determining whether a plurality of the user interface controls each have a high computed probability; and
in response to determining that at least two of the plurality of user interface controls have a high computed probability, providing a second user interface through which a user can specify which of the at least two of the plurality of user interface controls the received user input was intended.

11. The system of claim 8, wherein the one or more characteristics further comprises a motion of the received user input and the one or more corresponding characteristics further comprising a motion of the expected user input.

12. The system of claim 8, wherein the operation of computing the probability that the received user input was intended for that user interface control based on the comparison of the one or more characteristics associated with the received user input to the one or more corresponding characteristics associated with the expected user input comprises computing the probability that the received user input was intended for that user interface control based on a comparison of both the size and the shape of the received user input to the size and the shape of the expected user input to the user interface control.

13. The system of claim 8, wherein the probability is further computed based on a proximity of the received user input to the user interface control.

14. A method, comprising:
displaying, by a computing device, one or more user interface controls each defined by bounding coordinates;
receiving, at the computing device, a user input that is not within the bounding coordinates of any of the one or more user interface controls;
for at least one of the one or more user interface controls, computing, by the computing device, a probability that the received user input was intended for the user interface control based on a comparison of one or more characteristics associated with the received user input to one or more corresponding characteristics associated with an expected user input for the user interface control, the one or more characteristics comprising a type of user input and at least one of a shape, a size, or a motion of the expected user input and of the expected user input; and
providing, at the computing device, a notification that the received user input is a selection of the user interface control that is associated with a highest computed probability.

15. The method of claim 14, wherein providing, at the computing device, the notification that the received user input is the selection of the user interface control that is associated with the highest computed probability comprises providing, at the computing device, the notification that the received user input is the selection of the user interface control associated with the highest computed probability when the highest computed probability is greater than a threshold probability.

16. The method of claim 14, wherein the probability is further computed based on a distance from the received user input to the user interface control.

17. The method of claim 14, wherein the type of user input comprises one of a touch motion gesture, a single touch input, or a multi-touch input.

18. The method of claim 14, wherein providing, at the computing device, the notification that the received user input is the selection of the user interface control that is associated with the highest computed probability comprises passing the received user input to the user interface control associated with the highest computed probability.

19. The method of claim 14, wherein providing, at the computing device, the notification that the received user input is the selection of the user interface control that is associated with the highest computed probability comprises one of:

provBiding a notification to an operating system that the received user input is received for the user interface control associated with the highest computed probability; or providing a notification to an application that the received user input is received for the user interface control associated with the highest computed probability.

20. The method of claim 14, wherein the probability is further computed based on a proximity of the received user input to the user interface control.

* * * * *